United States Patent
Shinoda et al.

(10) Patent No.: US 6,611,830 B2
(45) Date of Patent: Aug. 26, 2003

(54) INFORMATION SEARCH METHOD AND SYSTEM FOR REGISTERING AND SEARCHING FOR ASSOCIATED MULTIMEDIA DATA USING EMBEDDED INFORMATION

(75) Inventors: Takashi Shinoda, Kashiwa (JP); Akihiro Youda, Tokyo (JP); Tsutomo Kato, Tokyo (JP); Atsushi Kikuta, Kashiwa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/245,744

(22) Filed: Feb. 8, 1999

(65) Prior Publication Data

US 2002/0059162 A1 May 16, 2002

(30) Foreign Application Priority Data

Feb. 12, 1998 (JP) .......................................... 10-029623

(51) Int. Cl.[7] .............................................. G06F 17/30
(52) U.S. Cl. ............................ 707/3; 707/104.1; 707/6; 713/176; 705/51; 382/181
(58) Field of Search ................................. 713/176, 201; 707/1, 3, 6, 104.1; 705/51, 26, 27; 709/203, 219, 227; 382/233, 181

(56) References Cited

U.S. PATENT DOCUMENTS

| | | | | |
|---|---|---|---|---|
| 5,875,249 A | * | 2/1999 | Mintzer et al. | 380/54 |
| 5,918,214 A | * | 6/1999 | Perkowski | 705/27 |
| 5,950,173 A | * | 9/1999 | Perkowski | 705/26 |
| 5,978,773 A | * | 11/1999 | Hudetz et al. | 705/23 |
| 5,987,459 A | * | 11/1999 | Swanson et al. | 707/6 |
| 6,018,801 A | * | 1/2000 | Palage et al. | 713/201 |
| 6,035,402 A | * | 3/2000 | Vaeth et al. | 713/201 |
| 6,047,374 A | * | 4/2000 | Barton | 713/150 |
| 6,076,077 A | * | 6/2000 | Saito | 705/51 |
| 6,122,403 A | * | 9/2000 | Rhoads | 382/233 |
| 6,131,162 A | * | 10/2000 | Yoshiura et al. | 713/176 |

OTHER PUBLICATIONS

Zhao et al. "A Digital Watermarking System for Multimedia Copyright Protection", Proceedings of the 4th ACM International conference on Multimedia, 1996, Boston MA, U.S, pp. 443–444.*

* cited by examiner

Primary Examiner—Jean R. Homere
Assistant Examiner—Khanh Pham
(74) Attorney, Agent, or Firm—Antonelli, Terry, Stout & Kraus, LLP

(57) ABSTRACT

A mark management server embeds a mark ID and so on in a specified mark image in response to a mark request from a WWW server, registers information related to a Web page corresponding to this mark ID in a mark management DB, and sends the mark embedded with the information to the server. The server attaches this mark to a created Web page, and registers the Web page in a Web page DB. A client terminal acquires a Web page from the server, reads information embedded in a mark, and issues a request for a search according to the mark to the server. The server references the DB, and sends information associated with a Web page corresponding to a specified mark ID to the terminal.

17 Claims, 9 Drawing Sheets

FIG.5

| MARK ID (501) | WEB PAGE URL (502) | PAGE NAME (503) |
|---|---|---|
| MRK01 | www.a.com | PAGE01 |
| MRK01 | www.b.co.jp | PAGE03 |
| MRK02 | www.c.com | PAGE05 |
| MRK02 | www.d.co.jp | PAGE07 |
| . . . | . . . | . . . |

FIG.6

| MARK ID (601) | MARK MANAGEMENT SERVER ADDRESS (602) |
|---|---|
| MRK01 | ADR01 |

FIG.9

| MARK ID | WEB PAGE URL | PAGE NAME | ORDER |
|---|---|---|---|
| MRK01 | www.a.com | PAGE01 | 1 |
| MRK01 | www.b.co.jp | PAGE03 | 2 |
| MRK01 | www.c.co.jp | PAGE05 | 3 |
| MRK01 | www.d.com | PAGE07 | 4 |
| . . . | . . . | . . . | . . . |

| MARK ID | MARK MANAGEMENT SERVER ADDRESS | FRONT | BEHIND |
|---|---|---|---|
| MRK01 | ADR01 | — | www.b.co.jp/ PAGE03 |
| MRK01 | ADR01 | www.a.com/ PAGE01 | www.c.co.jp/ PAGE05 |
| . . . | . . . | . . . | . . . |

601  602  603  604

INFORMATION SEARCH METHOD AND SYSTEM FOR REGISTERING AND SEARCHING FOR ASSOCIATED MULTIMEDIA DATA USING EMBEDDED INFORMATION

BACKGROUND OF THE INVENTION

The present invention relates generally to an information search system for searching for multimedia data, and more particularly to a system for searching for multimedia data based on fixed-pattern data such as a mark mounted in the multimedia data.

In recent years, WWW (World Wide Web) systems have become popular for utilizing networks such as the Internet. A WWW system comprises WWW servers each for providing a variety of information, and client terminals connected to the WWW servers through the Internet for receiving information provided therefrom. The respective WWW servers open their unique Web pages, such that a user can access a Web page by specifying URL (Uniform Resource Locater) corresponding to the Web page to a browser program running on a client terminal. The browser can display multimedia data such as text, image data, video data, audio data and so on included in the Web page thus acquired on a display device of the client terminal. A Web page is described using a structural description language called HTML (Hyper Text Mark-up Language), so that another Web page can be accessed through its URL set in a Web page.

When a client searches Web pages with a certain purpose, the client must access a Web page of a WWW server which provides a search service, and request for a key word search or specify a Web page which may satisfy the purpose of the client with reference to a link list provided by the search service. The link list refers to a Web page which collectively has a plurality of listed link destinations of Web pages previously selected in accordance with an intention of an editor.

While a Web page is a copyrighted work, a client, once acquiring the Web page, can readily create duplicates and deliver the duplicates through the Internet. For preventing unauthorized copies of digital data sent through the Internet in this way, "electronic watermark" techniques have been proposed for embedding ID information, a logo mark or the like of an author within a copyrighted work in secrecy.

According to the prior art search techniques mentioned above, it is not easy to search Web pages published by particular authors, Web pages highly evaluated by Web page evaluating organizations, and so on. Even if a search service provided on the WWW is utilized to conduct a key word search, this may result in a problematic situation which presents search missing that fails to include desired Web pages in a search result, and search noise that includes unwanted information. In addition, when existing link lists cannot be utilized, a client must create his own link list. However, creation of a link list involves describing link data to selected Web pages using the HTML, and so on. This work implies a problem in that a large number of work steps is required and the created list cannot flexibly support changes in Web pages, if any. Furthermore, it is also difficult to distinguish normally published Web pages from forged or tampered Web pages.

SUMMARY OF THE INVENTION

It is an object of the present invention to provide a system for searching only for normal multimedia data without relying on a key word search or creation of a link list, and a program for executing such a search.

Multimedia data handled by the present invention is assumed to be mounted with fixed-pattern data such as a logo mark, which is embedded with code information that is difficult for human to perceptually recognize. A program on a server for managing such fixed-pattern data embeds specified code information in specified fixed-pattern data in response to a request from the outside, and sends the fixed-pattern data to a requester. Then, the program registers a database with information related to multimedia data mounted with the code information, in correspondence to the code information, searches the database based on specified code information in response to a search request from a client, extracts information related to multimedia data corresponding to the specified code information, and sends the extracted information to a requester. A program on the client side in turn decodes code information embedded in fixed-pattern data mounted in multimedia data, issues to the management server a search request for information related to associated multimedia data based on the code information, and displays acquired information related to the associated multimedia data on a display device.

BRIEF DESCRIPTION OF THE DRAWINGS

FIG. 5 is a table showing a data structure for a mark management DB 2021 in the embodiment;

FIG. 6 shows an example of information embedded in a mark;

FIG. 9 is a table showing another example of a data structure for the mark management DB 2021;

FIG. 10 shows other examples of information embedded in the mark; and

DESCRIPTION OF THE PREFERRED EMBODIMENTS

An embodiment of the present invention will hereinafter be described with reference to the accompanying drawings.

Figure 1:
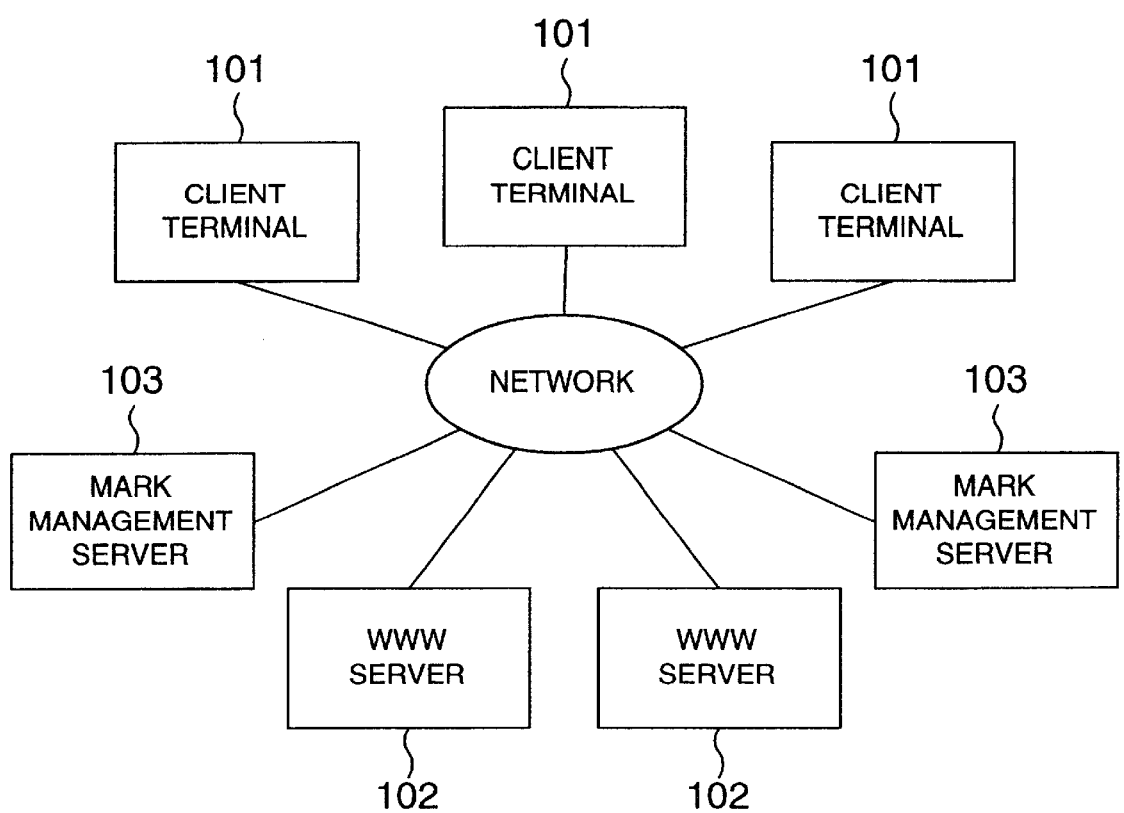
FIG. 1 is a block diagram illustrating the configuration of an information search system according to an embodiment of the present invention.

FIG. 1 is a block diagram illustrating the configuration of a system according to this embodiment. The system has a plurality of WWW servers 102 for providing information to a network such as the Internet; a plurality of client terminals 101 for accessing information provided by the WWW servers; and mark management servers 103 for managing a variety of marks, wherein they are all interconnected through the network. The mark herein referred to means still image data, and is assumed to be image data which allows the user to visually understand what the image data means when it is displayed. For example, the mark may be a logo of a credit card company, an award mark issued by a Web page evaluating organization, a recommendation mark, a symbol mark of a self-governing body, or the like.

Figure 2:
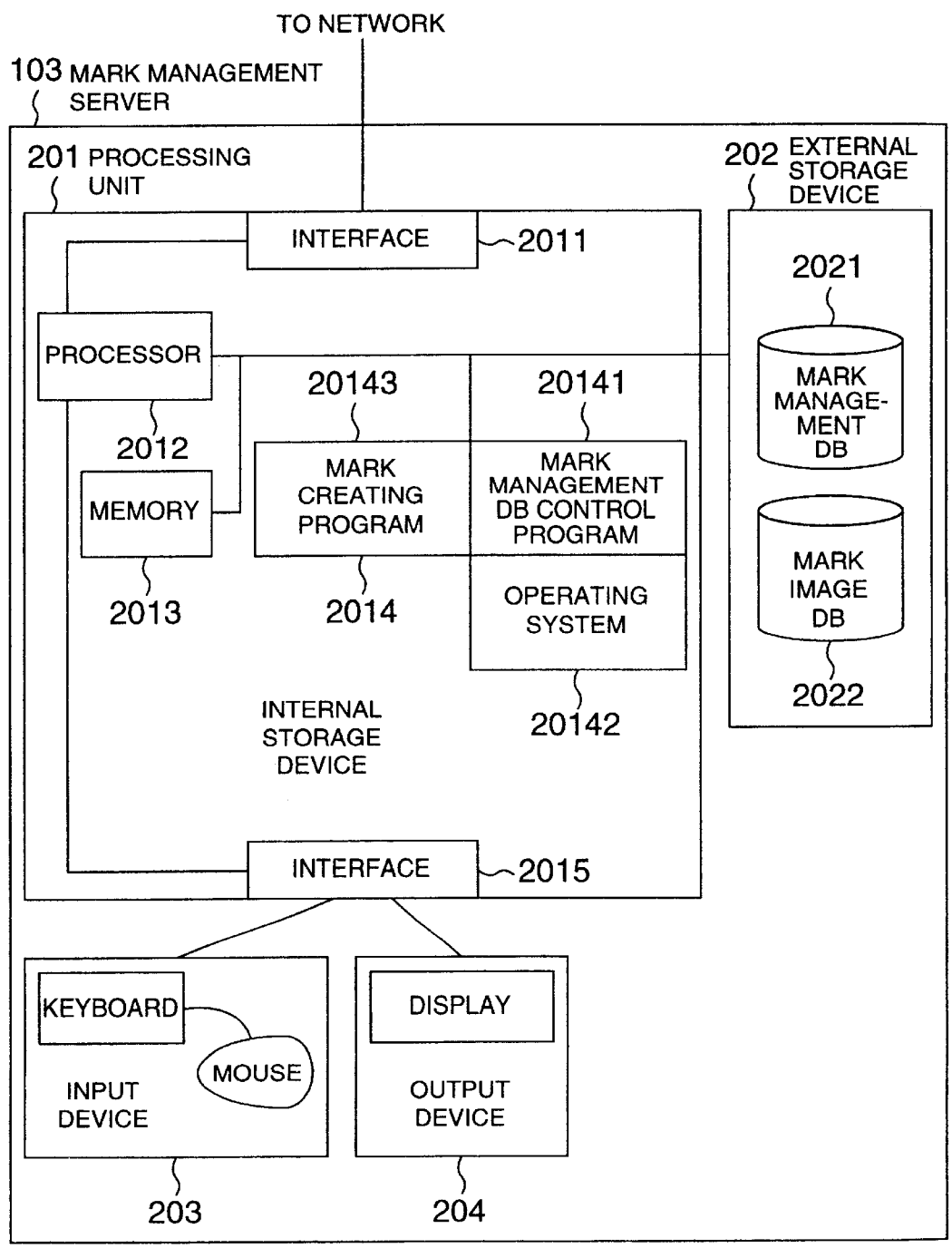
FIG. 2 is a block diagram illustrating the internal configuration of a mark management server 103 in the embodiment.

FIG. 2 is a block diagram illustrating the internal configuration of the mark management server 103. The mark management server 103 comprises a processing unit 201 such as PC (personal computer), WS (workstation) or the like; an external storage device 202 such as HDD (hard disk drive); input devices 203 such as a keyboard, a mouse and so on; and an output device 204 such as a display. The processing unit 201 includes an interface 2011 for connection to a network; a processor 2012 for processing associated with the mark management server 103; a memory 2013 for temporarily storing a program; an internal storage device 2014 for storing programs and data; and an interface 2015 for connection to input and output devices. The external storage device 202 stores a mark management DB (database) 2021 and a mark image DB 2022. The mark management DB 2021 stores information on Web pages to which a mark is attached, while the mark image DB 2022 stores image data associated with respective marks.

The internal storage device 2014 stores a mark creating program 20143, a mark management DB control program 20141 and an operating system 20142. The mark creating program 20143 fetches a specified mark image from the mark image DB 2022 in response to a mark transmission request from the WWW server 102, embeds the mark image with information such as an identifier of the mark, stores the specified mark identifier and information on a Web page to which this mark is attached (mounted) in the mark management DB 2021 through the mark management DB control program 20141, and transmits the mark image embedded with the information to the WWW server 102.

The mark management DB control program 20141 accesses the mark management DB 2021 in accordance with a request from the mark creating program 20143, and accesses the mark management DB 2021 in response to a request for associated information related to the same mark from a client terminal 101 to read requested information which is sent to the requesting client terminal 101. The processing performed by the mark management server 103 in accordance with a mark transmission request from the WWW server 102 for registering the mark management DB 2021 with information on a Web page to which a specified mark is attached, and transmitting an mark image embedded with information to the WWW server 102 is hereinafter called the "mark dispense processing".

Figure 3:
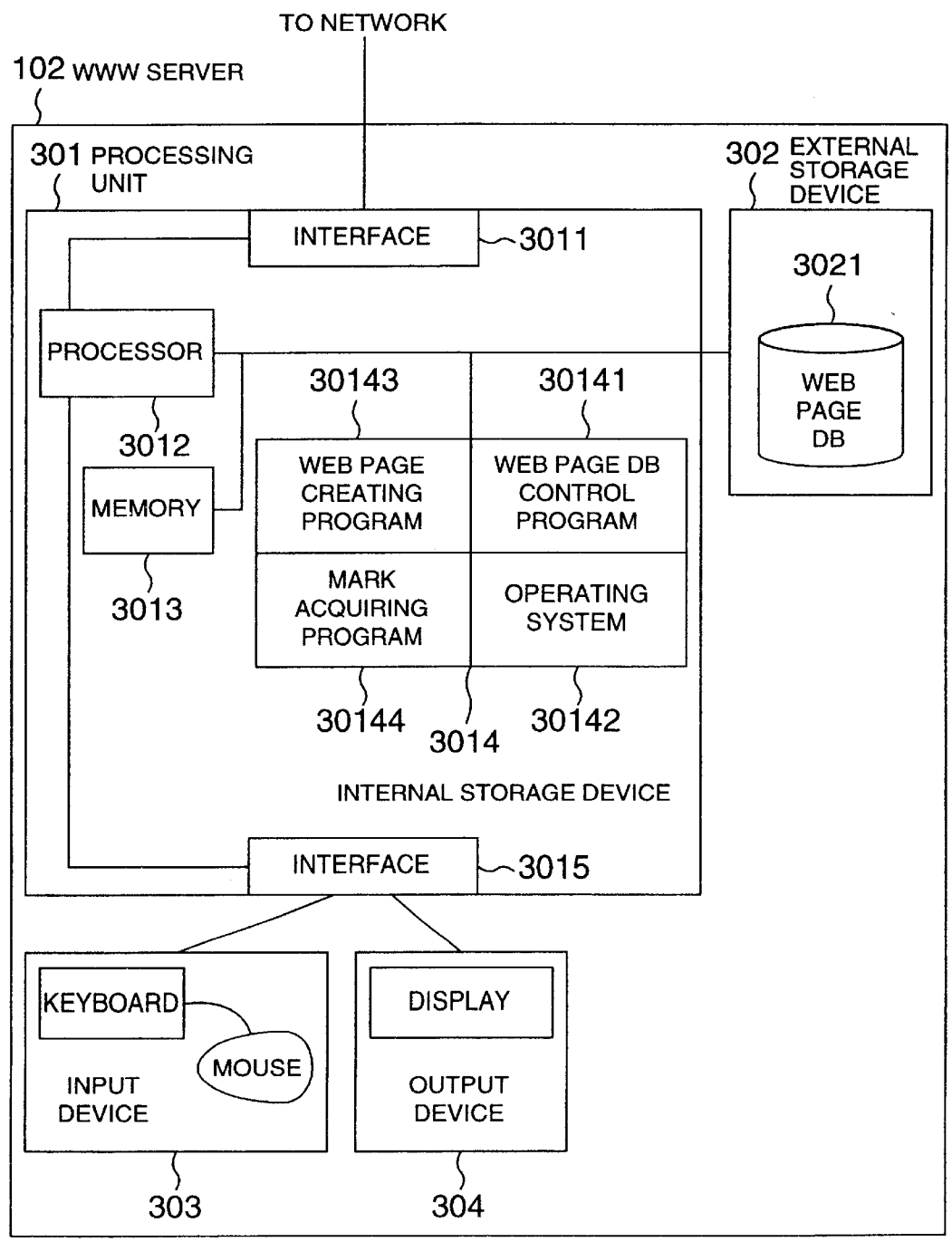
FIG. 3 is a block diagram illustrating the internal configuration of a WWW server 102 in the embodiment.

FIG. 3 is a block diagram illustrating the internal configuration of the WWW server 102. The WWW server 102 comprises a processing unit 301 such as PC, WS or the like; an external storage device 302 such as HDD; input devices 303 such as a keyboard, a mouse and so on; and an output device 304 such as a display. The processing unit 301 includes an interface 3011 for connection to a network; a processor 3012 for processing associated with the WWW server 102; a memory 3013 for temporarily storing a program; an internal storage device 3014 for storing programs and data; and an interface 3015 for connection with input and output devices. The external storage device 302 stores a Web page DB 3021, while the Web page DB 3021 stores a plurality of Web pages managed by the WWW server 102. The internal storage device 3014 stores a Web page creating program 30143, a Web page DB control program 30141, a mark acquiring program 30144 and an operating system 30142. The Web page creating program 30143 creates a Web page in accordance with instructions from the user through the input device 303, and attaches an acquired mark image to the created Web page which is then stored in the Web page DB 3021 through the Web page DB control program 30141. The Web page DB control program 30141 accesses the Web page DB 3021 in accordance with a request from the Web page creating program 30143, as well as accesses the Web page DB 3021 in response to a request from a client terminal 101 to read a requested Web page therefrom, and sends the read Web page to the client terminal 101. The mark acquiring program 30144 issues a mark transmission request to the mark management server 103 in response to a request from the Web page creating program 30143, and passes an acquired mark image to the Web page creating program 30143.

Figure 4:
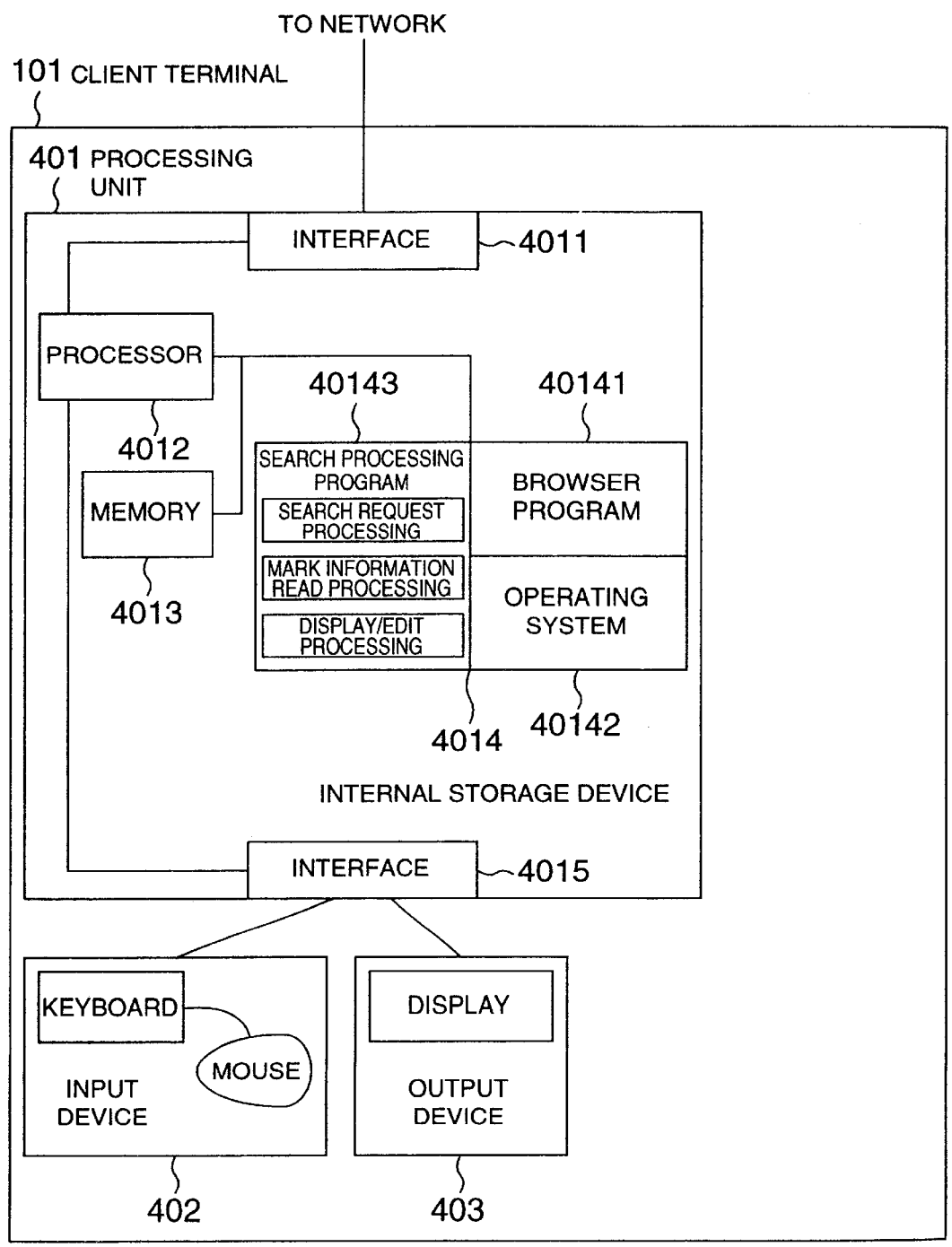
FIG. 4 is a block diagram illustrating the internal configuration of a client terminal 101 in the embodiment.

FIG. 4 is a block diagram illustrating the internal configuration of the client terminal 101. The client terminal 101 comprises a processing unit 401 such as PC, WS or the like; input devices 402 such as a keyboard, a mouse and so on; and an output device 403 such as a display. The processing unit 401 includes an interface 4011 for connection to a network; a processor 4012 for processing associated with the client terminal 101; a memory 4013 for temporarily storing a program; an internal storage device 4014 for storing programs and data; and an interface 4015 for connection to input and output devices. The internal storage device 4014 stores a browser program 40141, a search processing program 40143, and an operating system 40142. The browser program 40141 issues a Web page transmission request to the WWW server 102, and displays an acquired Web page on the output device 403. The search processing program 40143 receives a search request from the browser program 40141 to extract embedded information from a specified mark image, issues a search request for associated information related to the mark to the mark management server 103, edits acquired information on associated Web pages, and displays the edited information on the output device 403. Search request processing in the search processing program 40143 issues a search request to the mark management server 103 in response to a search request for associated information related to the mark from the browser program 40141. Mark information read processing decodes information embedded in a mark image. Display/edit processing in turn edits and displays a list of acquired Web pages associated with the mark.

FIG. 5 is a table showing a data structure for the mark management DB 2021. Each record in the mark management DB 2021 is composed of a mark ID 501; a Web page URL 502 and a page name 503. The mark ID 501 is an identifier for each mark image stored in the mark image DB 2022. The Web page URL 502 is the URL of a Web page to which the mark is attached. The page name 503 may be a name, entry information or the like which shows the contents of the Web page.

FIG. 6 shows an example of information embedded in a mark image. Each mark image is embedded with character strings indicative of a mark ID 601 and a mark management server address 602 as code information. The mark ID 601 is an identifier of each mark image, and the mark management server address 602 indicates the address of the mark management server 103 that has embedded information in the mark.

Figure 7:
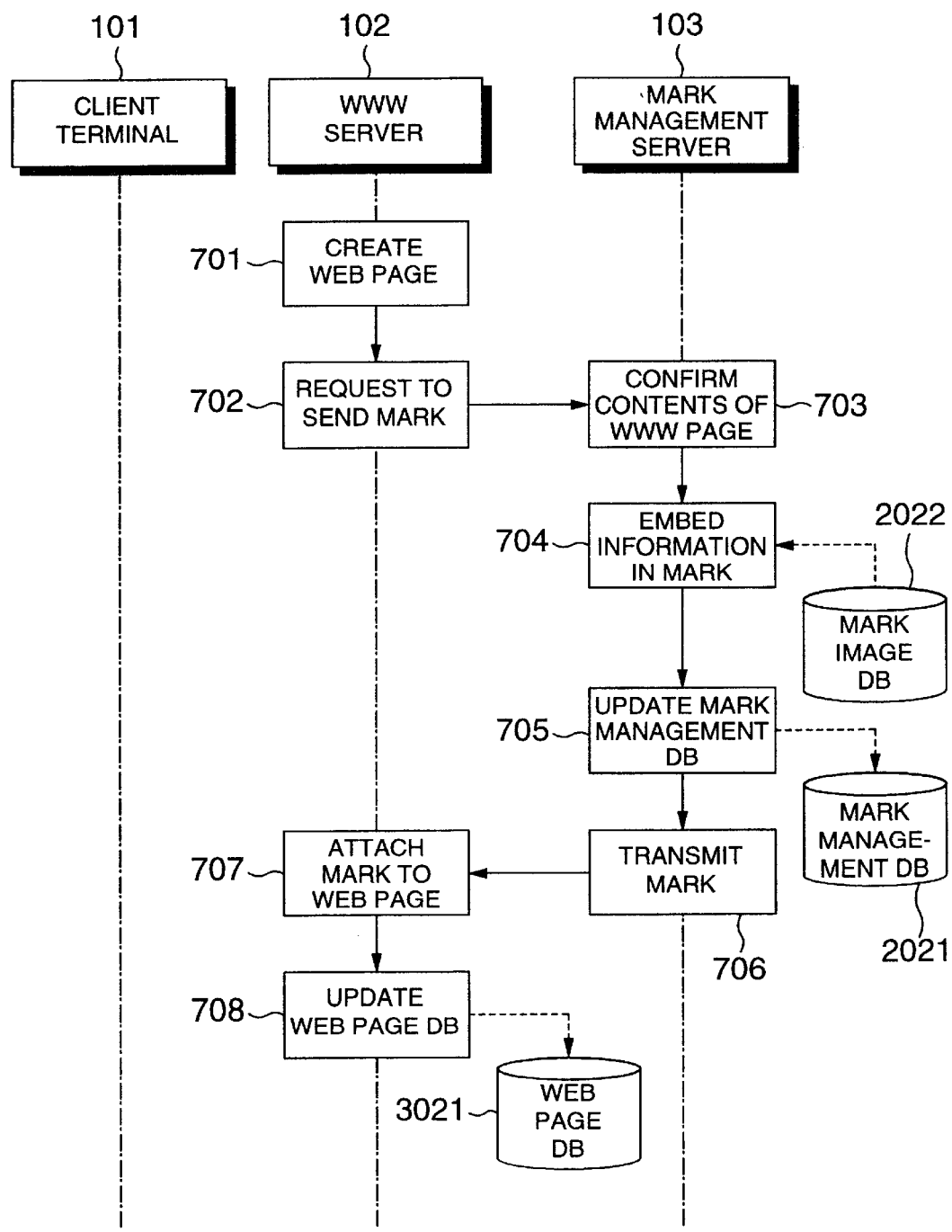
FIG. 7 is a flow diagram illustrating a procedure for a mark dispense processing in the embodiment.

FIG. 7 is a flow diagram illustrating a procedure for the mark dispense processing. The Web page creating program 30143 of the WWW server 102 interacts with a manager of a WWW server through the input device 303 and the output device 304 to create a Web page, and stores the created Web page in the Web page DB 3021 through the Web page DB control program 30141 (step 701). In this event, an access permission for the Web page stored in the Web page DB 3021 is not granted to ordinary users so that they cannot access this Web page. Next, the mark acquiring program 30144 issues a request to the mark management server 103 to send a mark to be attached to the created Web page (step 702). This sending request includes a mark ID, a Web page URL and a page name. The mark creating program 20143 of the mark management server 103 authenticates the user for this sending request, and then acquires a pertinent Web page based on the specified URL, and displays the Web page on the output device 204 for allowing the operator of the mark management server 103 to confirm the contents of the Web page (step 703). When the operator requests to display a mark image, the mark creating program 20143 accesses the mark image DB 2022 based on a received mark ID, and displays the mark image associated with the mark ID on the output device 204. After the operator determines that the mark may be dispensed to the Web page, for which the mark has been requested, without problem, when a mark dispensing instruction is issued through the input device 203, the mark creating program 20143 embeds the mark ID 601 and the mark management server address 602 in the requested mark image (step 704). A technique for embedding particular information in a mark image is known as "digital watermark" which is described, for example, in Nikkei Electronics, pp. 100–107, No. 683, 1997. Next, the mark creating program 20143 registers the mark ID 501 of the dispensed mark image, and the URL 502 and the page name 503 of the requested Web page in the mark management DB 2021 (step 705). Next, the mark creating program 20143 transmits the mark image embedded with the information to the WWW server 102 (step 706).

The mark acquiring program 30144 of the WWW server 102, which has received the mark image, passes it to the Web page creating program 30143. The Web page creating program 30143 attaches this mark image to a created Web page to create a marked Web page (step 707). For attaching the mark, the Web page and the mark image are displayed on the output device 304, and the mark is attached at a location specified by the manager on the Web page. Next, the pertinent Web page previously registered on the Web page DB 3021 is updated with the marked Web page (step 708). Then, the access permission for the updated Web page is changed to be accessible by ordinary users.

Figure 8:
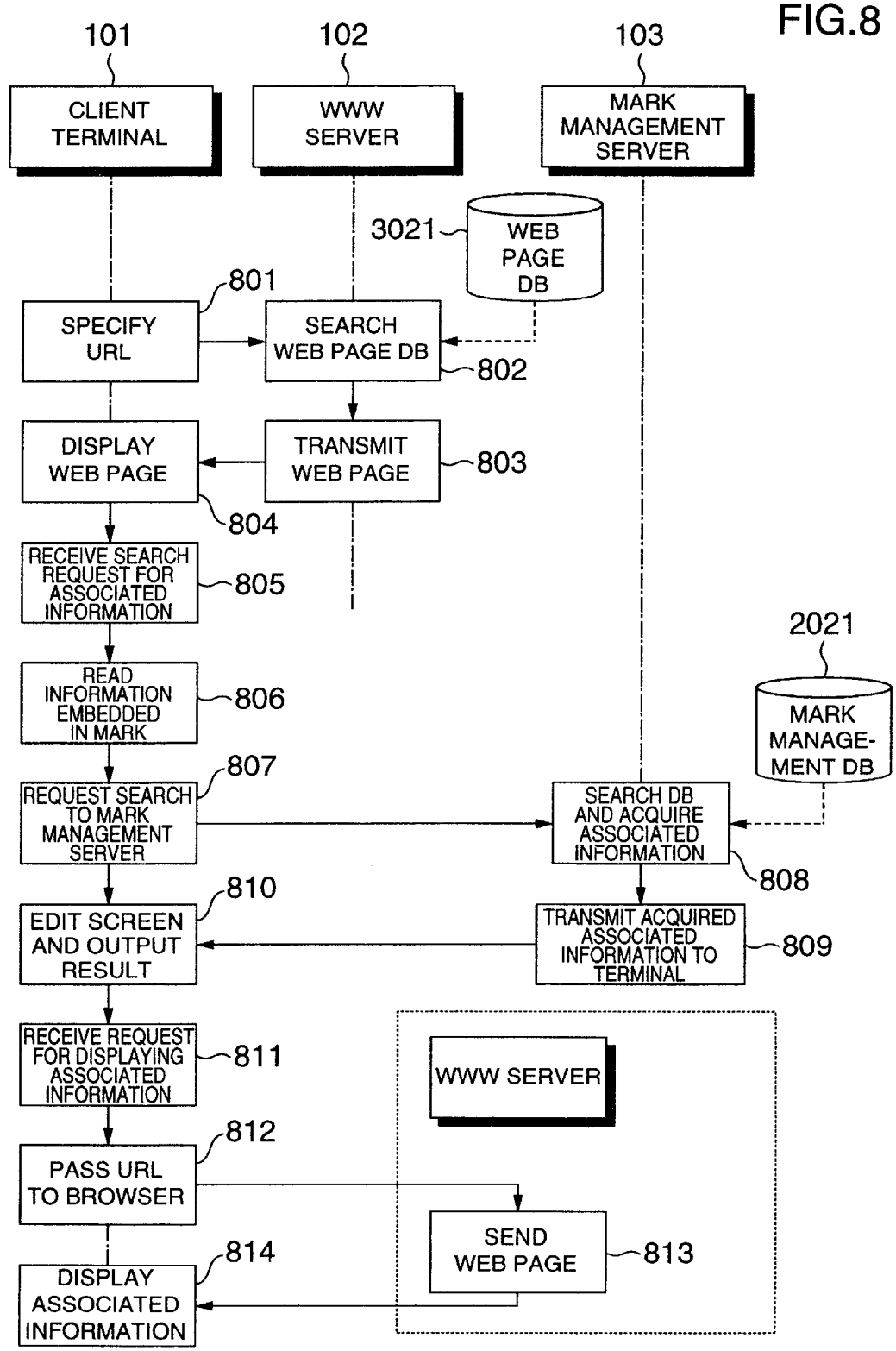
FIG. 8 is a flow diagram illustrating a procedure for an information search which utilizes the mark in the embodiment.

FIG. 8 is a flow diagram illustrating a procedure for information search utilizing a mark. It should be noted that the information search herein mentioned refers to the processing for searching for Web pages which have attached thereon the same mark as a mark attached on a certain Web page, dispensed from the mark management server 103. The browser program 40141 of the client terminal 101 requests a pertinent WWW server 102 to transmit a Web page based on a URL specified through the input device 402 (step 801). The Web page DB control program 30141 of the WWW server 102 receives this transmission request, searches the Web page DB 3021 (step 802), retrieves the specified Web page, and transmits the contents of that Web page to the client terminal 101 (step 803). Assume that the retrieved Web page has a mark attached thereon, dispensed from the mark management server 103. The browser program 40141 of the client terminal 101 displays the received Web page on the output device 403 (step 804). The user can visually recognize what the mark displayed on the output device 403 represents, but cannot visually recognize information embedded in the mark. When a search request is made for associated information by specifying a mark attached on a Web page through the input device 402, the search request processing is started in the search processing program 40143 (step 805). This processing in the search processing program 40143 starts the mark information read processing.

The mark information read processing reads information (the mark ID 601 and the mark management server address 602) embedded in a mark image (step 806). The technique for reading text information from a mark image is known as a part of the "digital watermark" technique. Next, the search request processing requests the mark management server 103 to search for associated information based on the information embedded in the mark (step 807). Upon receipt of the request, the mark management DB control program 20141 of the mark management server 103 searches the mark management DB 2021 to acquire the Web page URLs 502 and the page names 503 of Web pages (having the same mark ID 501 as the received mark) to which the same mark as the specified one has been dispensed (step 808). Next, the mark management DB control program 20141 transmits a list of the Web page URLs 502 and the page names 503, which have been acquired as the associated information, to the client terminal 101 (step 809). The search processing program 40143 of the client terminal 101 edits the received information with its display/edit processing, and displays the edited information on the output device 403 through the browser program 40141 (step 810).

When any Web page within the associated information is requested for display through the input device 402 (step 811), the search processing program 40143 passes the URL of a selected Web page to the browser program 40141, and the browser program 40141 requests the WWW server 102 associated with the URL to transmit the Web page (step 812). The Web DB control program 30141 of the WWW server 102 searches the Web page DB 3021 to retrieve the specified Web page, and sends the contents thereof to the client terminal 101 (step 813). The browser program 40141 of the client terminal 101 displays the received Web page on the output device 403 (step 814).

As described above, since the mark management sever 103 holds mark dispense information on the mark management DB 2021 implemented therein, the mark management server 103 can specify a destination to which the same mark has been dispensed, and therefore allows the mark ID 501 to be used as a key for searching for the associated information.

While the user could duplicate a mark image within a Web page acquired from the WWW server 102 and attach the duplicate to a Web page created thereby without authorization, such a Web page is not registered in the mark management server 103 and therefore is not regarded as an object of a search for the associated information as described above. In addition, for a Web page on which a mark thus forged is attached, an illegally duplicated mark can be detected by referring to the mark management server 103 based on the mark ID and the Web page URL thereof. Furthermore, since the information embedded in a mark image is difficult to tamper, it is difficult for an unauthorized user to modify information embedded in a normal mark image to information convenient to him. It is therefore possible to prevent the action of distributing false marks forged from an authoritative mark, which has been famous, over a network.

As described above, since the client terminal 101 decodes information embedded in a mark, this information is likely to be acquired and abused by the user. As a method of ensuring the security for embedded information, a method of encrypting the embedded information is contemplated. For example, the mark management server 103 may encrypt information to be embedded in a mark using a secret key, prior to the embedding of the information in the mark, in the processing for embedding information in a mark (step 704). The client terminal 101 requests the mark management server 103 to send a public key, and the mark management server 103 responsively sends the public key to the client terminal 101. The client terminal 101 acquires the encrypted code information embedded in the mark from the mark management server 103, and decrypts the code information embedded in the mark using the public key before utilizing the code information. While the users can relatively easily acquire this public key, the users can be managed through user authentication.

When the same mark has been dispensed to a large number of Web servers, attribute information may be added to each record in the mark management DB 2021 such that the attribute information is utilized for searching for a mark. For example, an entry called "intended age" may be provided as attribute information, wherein a search result may be narrowed up by specifying the attribute as a search condition if Web pages are classified into those "for 20 years or more" and those "for under 20 years". Also, as illustrated in FIG. 9, an entry called "order" 504 may be added as attribute information in each record of the mark management DB 2021 in addition to the mark ID 501, the Web page URL 502 and the page name 503. In this case, the mark management DB control program 201411 may refer to the order 504 in the mark management DB 2021 to sort pertinent records according to the order 504 used as a key, and then send a search result to the client terminal 101, thereby making it possible to display the search result in the order set in the mark management DB 2021.

Of course, the mark management DB control program 20141 may transfer pertinent records in the mark management DB 2021 as they are to the client terminal 101, so that the client terminal 101 can sort the records according to the order 504 used as a key. With such a method, Web pages having the same mark are browsed by the user of the client terminal 101 in an order intended by a mark dispenser.

Alternatively, a mark may be embedded with the position in the order at which an associated Web page is browsed, instead of providing the order 504 in each record in the mark management DB 2021. FIG. 10 shows exemplary records which have information labelled front 603 and behind 604 embedded therein in addition to the mark ID 601 and the mark management server address 602, as information to be embedded in a mark. Each line in FIG. 10 corresponds to each of Web pages having the same mark, wherein front 603 sets the URL and page name of a Web page positioned immediately in front of a current Web page, while behind 604 sets the URL and page name of a Web page positioned immediately behind the current Web page. With this method, the mark management server 103 is only required to send the client terminal 101 the Web page URL 502 and the page name 503 of the record at the head of a group of Web pages having the same mark, and the client terminal 101 can directly access a Web page positioned in front of or behind a displayed Web page.

While the foregoing embodiment has shown an example of searching for associated information for a single mark, the client terminal 101 may simultaneously issue search requests to a plurality of marks, so that a plurality of marks may be dispensed respectively from different mark management servers 103 without incurring any problem.

Figure 11:
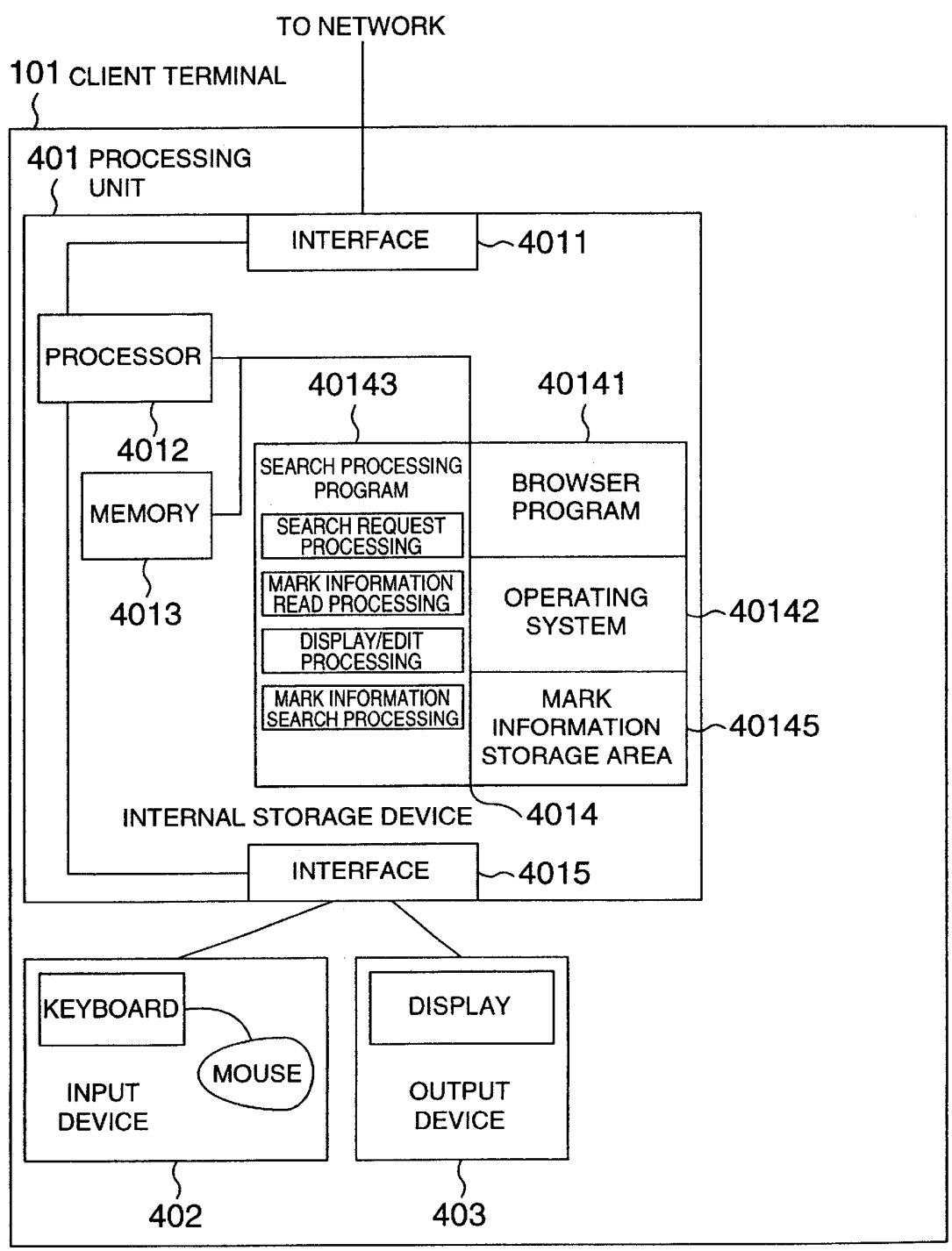
FIG. 11 is a block diagram illustrating the internal configuration of the mark management server 103 according to another embodiment.

Also, while in the foregoing embodiment, the mark management server 103 notifies the client terminal 101 of destinations to which a specified mark has been dispensed, the mark management server 103 may also transfer the contents of the mark management DB 2021 to the client terminal 101 utilizing techniques such as file transfer or the like, in response to desire to know which marks can be otherwise seen, or to make a search for associated information for another mark. FIG. 11 illustrates the internal configuration of a client terminal 101 which handles a transferred mark management DB 2021. An internal storage device 4014 is provided therein with a mark information storage area 40145 for storing the contents of the mark management DB 2021, and a search processing program 40143 is provided therein with mark information search processing as a program for searching the mark information storage area 40145.

While in the foregoing embodiment, the mark management DB 2021 is located on the mark management server 103, it may be located on any other database server which may be accessible by the mark management server 103, instead of locating it on the mark management server 103. Also, while in the foregoing embodiment, the mark management server 103 performs the mark dispense processing and the search processing, the mark management server 103 may be dedicated only to the mark dispense processing, while the search processing may be assigned to another server having duplicated contents of the mark management DB 2021, in view of the loading on the servers. In this case, the address of a search server may be embedded in a mark instead of embedding the address of the mark management server 103. Also, in this case, a plurality of search servers may be provided corresponding to the single mark management server 103 for distributing the load of the search processing.

While the foregoing embodiment has been described in connection with marks implemented by still image data, the present invention is not limited to this particular type of marks. When perceptually recognizable data formed of a single or a combination of a plurality of character data (text information), still image data, video data (moving image data) and audio data is called multimedia data, the present invention can be applied to fixed-pattern data that may constitute a portion of such multimedia data as a mark. For example, the present invention can be applied to the case where the multimedia data is media data such as a movie including video data and audio data, and a mark is a fixed-pattern data that constitutes a portion of the video data or the audio data. As an example of embedding secret information in character data, there is such a method that adds a predetermined number of blanks between characters which constitutes text information, or behind the character string. Also, a technique is known for embedding secret information in audio information so as not to be audibly recognizable. When video data or audio data is applied as a mark, this may exceed the concept of a normal mark, or the concept of attaching a mark to a Web page. In this case, however, what is equivalent to a Web page may be corresponded to the body of multimedia data including entry information such as a title, a publisher or the like; the mark to fixed-pattern data mounted in the multimedia data body; and the mark ID to an identifier of this fixed-pattern data (an identifier of a copyright owner or the like).

According to the present invention as described above, since information on associated multimedia data stored in a database is extracted on the basis of code information embedded in fixed-pattern data mounted in the multimedia data, targeted normal multimedia data can be searched for without causing search missing or search noise associated with a key word search or without requiring a large number of steps which would be required to create a link list.

What is claimed is:

1. A computer-implemented information search processing method for registering information related to multimedia data defining a Web page with recognizable fixed-pattern data having code information associated therewith in a database, said method comprising the steps of:
   (a) in response to a request from a requester, embedding perceptually unrecognizable code information using a digital watermark in perceptually recognizable fixed-pattern data mounted in said multimedia data including at least one of character data, still image data, moving image data and audio data, and sending said multimedia data embedded with said code information to the requester;
   (b) registering information related to said multimedia data embedded with said code information in the database, in correspondence with said code information; and
   (c) in response to a search request from a requester, searching said database on specified code information to extract information on said multimedia data corresponding to the specified code information, and sending the extracted information to the requester,
   wherein said fixed-pattern data, embedded with said code information using said digital watermark, is a mark image in the form of a still image.

2. A computer-implemented information search method for requesting to search for associated multimedia data defining a Web page based on perceptually unrecognizable code information embedded in perceptually recognizable fixed-pattern data using a digital watermark, mounted in said multimedia data including at least one of character data, still data, moving image data, and audio data, said method comprising the steps of:
   (a) decoding said code information embedded in said fixed-pattern data using said digital watermark, related to said multimedia data, wherein said fixed-pattern data embedded with said code information using said digital watermark is a mark image in the form of a still image;
   (b) issuing a search request for information related to said multimedia data to an external processing unit based on said code information, said external processing unit having information related to said multimedia data corresponding to said code information as a database; and
   (c) displaying acquired information related to said multimedia data on a display device.

3. A computer-implemented information search processing method for requesting to search for associated multimedia data defining a Web page based on visually unrecognizable code information embedded, using a digital watermark, in a visually recognizable mark image mounted in said multimedia data including at least one of character data, still data, moving image data and audio data, said method comprising the steps of:
   (a) displaying said mark image embedded with said code information in the form of a still image, on a display device;
   (b) issuing, to an external processing unit, a search request for information related to said multimedia data based on said code information embedded therein using said digital watermark, when said mark image was specified; and
   (c) displaying acquired information related to said multimedia data on said display device.

4. An information search system having a first server for providing multimedia data defining a Web page including at least one of character data, still image data, moving image data and audio data, a client terminal for receiving said multimedia data provided by said first server, and a second server for embedding perceptually unrecognizable code information using a digital watermark in perceptually recognizable fixed-pattern data mounted in said multimedia data for managing information related to said multimedia data mounted with said code information, wherein:
   said first server includes means responsive to a request from said client terminal for sending specified multimedia data to said client terminal, means for requesting said second server to send said fixed-pattern data embedded with said code information using said digital watermark, and means for mounting said fixed-pattern data in corresponding said multimedia data, wherein said fixed-pattern data embedded with said code information using said digital watermark is a mark image in the form of a still image;
   said second server includes means responsive to a request from said first server for mounting specified code information in specified fixed-pattern data and sending said fixed-pattern data to said first server, means for registering information related to said multimedia data mounted with said code information in a database, and means responsive to a search request from said client terminal for searching said database based on specified code information to extract information related to said multimedia data corresponding to the specified code information and sending the extracted information to said client terminal; and
   said client terminal includes means for requesting said first server to acquire said multimedia data mounted with said fixed-pattern data, means for decoding code information embedded in acquired fixed-pattern data, means for issuing to said second server a search request for information related to said multimedia date associated with said code information based on decoded code information, and means for displaying acquired information related to said multimedia data on a display device.

5. A computer program embodied on a computer-readable medium to perform method steps for registering in a database information related to multimedia data defining a Web page, having code information associated therewith, said method steps comprising:
   (a) in response to a request from a requester, embedding perceptually unrecognizable code information using a digital watermark in perceptually recognizable fixed-pattern data mounted in said multimedia data including at least one of character data, still image data, moving image data and audio data, and sending said multimedia data embedded with said code information to the requester;
   (b) registering information related to said multimedia data embedded with said code information in the database, in correspondence with said code information; and
   (c) in response to a search request from a requester, searching said database based on specified code information to extract information on said multimedia data corresponding to the specified code information, and sending the extracted information to the requester,
   wherein said fixed-pattern data, embedded with said code information using said digital watermark, is a mark image in the form of a still image.

6. A computer program embodied on a computer-readable medium to perform method steps far requesting to search for associated multimedia data defining a Web page based on perceptually unrecognizable code information embedded, using a digital watermark, in perceptually recognizable fixed-pattern data mounted in said multimedia data including at least one character data, still image data, moving image data and audio data, said method steps comprising:

(a) decoding said code information embedded in said fixed-pattern data using said digital watermark, related to said multimedia data, wherein said fixed-pattern data embedded with said code information using said digital watermark is a mark image in the form of a still image;

(b) issuing a search request for information related to said multimedia data to an external processing unit based on said code information, said external processing unit having information related to said multimedia data corresponding to said code information as a database; and (c) displaying acquired information related to said multimedia data on a display device.

7. A computer program embodied on a computer-readable medium to perform method steps for requesting to search for associated multimedia data defining a Web page based on visually unrecognizable code information embedded in a visually recognizable mark image, using a digital watermark, mounted in said multimedia data including at least one character data, still image data, moving image data and audio data, said method steps comprising:

(a) displaying said mark image embedded with said code information in the form of a still image, on a display device;

(b) issuing to an external processing unit a search request for information related to said multimedia data based on said code information embedded therein using said digital watermark, when said mark image was specified; and (c) displaying acquired information related to said multimedia data on a display device.

8. An information system, comprising:

a first server arranged to provide multimedia data defining a Web page, including at least one of character data, still image data, moving image data and audio date;

a second server arranged to embed perceptually unrecognizable code information, using a digital watermark, in perceptually recognizable fixed-pattern data mounted in said multimedia data for managing information related to said multimedia data mounted with said code information, wherein said fixed-pattern data embedded with said code information using said digital watermark is a mark image in the form of a still image; and a client terminal connected to said first server and said second server, via a network, and arranged to receive said multimedia data provided by said first server, wherein said first server is configured to send specified multimedia data to said client terminal in response to a request from said client terminal, to request said second server to send said fixed-pattern data embedded with said code information using said digital watermark, and to mount said fixed-pattern data in corresponding said multimedia data;

wherein said second server is configured to mount specified code information in specified fixed-pattern data and send said fixed-pattern data to said first server in response to a request from said first server, to register information related to said multimedia data mounted with said code information in a database, and to search said database based on specified code information to extract information related to said multimedia data corresponding to the specified code information and send the extracted information to said client terminal in response to a search request from said client terminal; and wherein said client terminal is configured to request said first server to acquire said multimedia data mounted with said fixed-pattern data, to decode code information embedded in acquired fixed-pattern data using said digital watermark, to send a search request to said second server for information related to said multimedia data associated with said code information based on decoded code information, and to provide a visual display of acquired information related to said multimedia data.

9. An information system according to claim 8, wherein said first server corresponds to a World Wide Web (WWW) server arranged to create a web page and attach a mark image to the web page, and said second server corresponds to a mark management server arranged to confirm contents of the web page, embed information in the mark image and transmit the mark image to the WWW server for attachment to the web page.

10. An information search processing method according to claim 1, wherein the information related to said multimedia data includes a uniform resource locator (URL) of a Web page.

11. An information search processing method according to claim 2, wherein the information related to said multimedia data includes a uniform resource locator (URL) of a Web page.

12. An information search processing method according to claim 3, wherein the information related to said multimedia data includes a uniform resource locator (URL) of a Web page.

13. An information search system according to claim 4, wherein the information related to said multimedia data includes a uniform resource locator (URL) of a Web page.

14. A computer program according to claim 5, wherein the information related to said multimedia data includes a uniform resource locator (URL) of a Web page.

15. A computer program according to claim 6, wherein the information related to said multimedia data includes a uniform resource locator (URL) of a Web page.

16. A computer program according to claim 7, wherein the information related to said multimedia data includes a uniform resource locator (URL) of a Web page.

17. An information system according to claim 8, wherein the information related to said multimedia data includes a uniform resource locator (URL) of a Web page.

* * * * *